United States Patent [19]
Matile et al.

[11] Patent Number: 5,098,087
[45] Date of Patent: Mar. 24, 1992

[54] POLE PROPELLED LAND VEHICLE

[76] Inventors: Curtis L. Matile, 4201 W. Union Ave., Denver, Colo. 80236; Gary L. Kurbis, 1557 Elgin Ave., Joliet, Ill. 60432

[21] Appl. No.: 711,453

[22] Filed: Jun. 6, 1991

[51] Int. Cl.⁵ .................... A63B 69/18; A63B 25/08
[52] U.S. Cl. ........................ 482/68; 280/210; 280/87.021
[58] Field of Search .............. 272/70, 72, 93, 97, 272/70.3, 114, 115; 280/210, 819, 826, 842, 87.021, 87.041, 87.042

[56] References Cited

U.S. PATENT DOCUMENTS

| | | | |
|---|---|---|---|
| 1,052,722 | 2/1913 | Hegel | 280/87.021 |
| 1,607,958 | 11/1926 | Koehler | 280/87.021 |
| 2,162,646 | 6/1939 | Shipman | 280/210 |
| 4,023,795 | 5/1977 | Pauls | 272/97 |

*Primary Examiner*—Stephen R. Crow
*Attorney, Agent, or Firm*—Edna M. O'Connor; Gregory W. O'Connor

[57] ABSTRACT

A wheeled vehicle and propulsion device therefor is provided comprising an elongated pole, and at a first end of said pole, a handle for manipulation by the operator of the vehicle. At a second end of the pole is a ground engaging element for frictionally engaging the surface over which the vehicle is to be propelled. This ground engaging element includes a wheel member, and a clutch interconnecting said wheel member with said pole, the clutch device constructed so that the wheel turns freely in one rotational direction, but resists turning in the other rotational direction. Thus, when said ground engaging element is pushed against said surface in one direction, thrust from said handle is transmitted through the pole, through the wheel member and to the ground so that said vehicle is urged in the opposite direction, but when said wheel member is permitted to merely roll along the surface, the wheel member rotates freely.

10 Claims, 2 Drawing Sheets

POLE PROPELLED LAND VEHICLE

BACKGROUND OF THE PRIOR ART

Wheelchairs and the like provide the traditional means of transportation and autonomy for individuals having restricted use of their legs. It would be desirable to provide alternate wheeled transportation which provides exercise for other muscle groups than are normally employed in wheelchair operation. While skiing is a wonderful winter sport which can be enjoyed by paraplegic individuals through the use of special sled type vehicles, such activities are restricted to snow conditions, as is skiing with conventional equipment.

There are many wheeled vehicles which could be used or adapted for transportation of disabled as well as used by the abled. For example U.S. Pat. No. 1,052,722 to Hegel shows poles used to push the operator of a castor supported board-like vehicle. U.S. Pat. No. 4,930,796 to Harrod shows a skateboard-like riding toy with bicycle type handle bars.

None of these patents suggest the clutch driven wheel arrangement according to the subject invention.

OBJECTS OF THE INVENTION

It is one object of the invention to provide a vehicle and propulsion means that use various neuro-muscular and operator skills to manually propel the operator. It is another object to provide a manually operated propulsion system for a seated operator which can also be used to slow or brake the vehicle.

BRIEF DESCRIPTION OF THE INVENTION

Accordingly, a propulsion device for a wheeled vehicle is provided comprising an elongated pole, and at a first end of said pole, a handle for manipulation by the operator of the vehicle. At a second end of the pole is a ground engaging means for frictionally engaging the surface over which the vehicle is to be propelled. This ground engaging means includes a wheel means, and a clutch interconnecting said wheel means with said pole; the clutch device constructed so that the wheel turns freely in one rotational direction, but resists turning in the other rotational direction. Thus, when said ground engaging means is pushed against said surface in one direction, thrust from said handle is transmitted through the pole, through the wheel means and to the ground so that said vehicle is urged in the opposite direction, but when said wheel means is permitted to merely roll along the surface, the wheel means rotates freely.

Also provided is a manually operable ground engaging propulsion device in combination with a specially constructed light weight vehicle for a seated operator.

Preferably, the handle means includes a handle to be gripped by the operator and a strap loop for engaging the wrist or forearm of the operator. Also, the wheel means includes a surface engaging annular tire, a hub means for rotationally mounting said tire, and mounting means for attaching said hub to the pole. The hub incorporates the clutch means.

DETAILED DESCRIPTION OF THE PREFERRED EMBODIMENT

Figure 8:
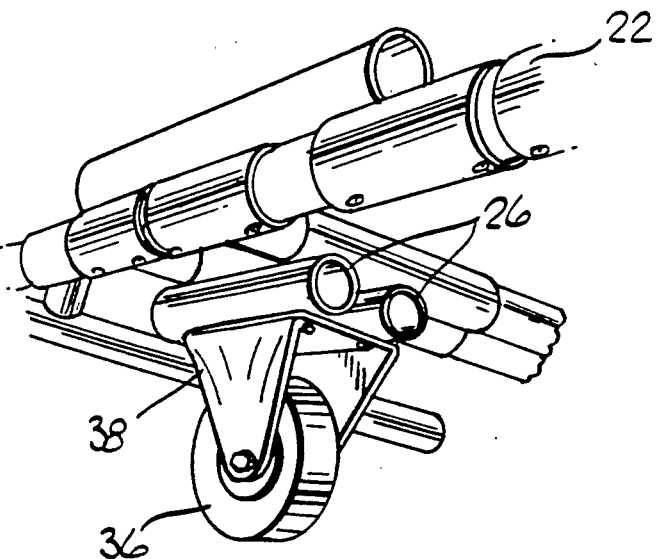
FIG. 8 is a partial, perspective view of the wheel mounting system.

Referring to the figures, the preferred embodiment includes a self propelled wheeled vehicle 10 in combination with ski pole-like propulsion means 40. The wheeled platform includes a seat-like support 28 positioned between front and back castor type wheels 32 and 34 respectively arranged in pairs at the front and back of a frame 22 which forms the base of the vehicle 10. A central pair of wheels 36 are mounted on fixed yolks 38 so as to position them at a distance "x" behind the center of gravity of the combination of the vehicle and a typical operator. The seat 28 could be adjustably mounted, as on ratcheted rails, to permit adjustment of the position of the operator relative to these wheels so that the performance of the vehicle can be optimized. The frame 22 is preferably constructed of conventional pvc plumbing pipe. Straight lengths and various conventional fittings, e.g. "T", "L" may be glued together to form the ladder-like frame with cross pieces spaced along elongated side rails at intervals to form supports for the seat 28, the pairs of wheels, foot rest, and front and rear bumpers. Alternatively, the frame of the vehicle 10 could be made of alloy aluminum tubing bent and welded to provide a generally rectangular frame. The side rails may be doubled to increase the stiffness of the overall frame. Extra lengths of pipe shown at 26 (FIG. 8) serve as an extra thickness to place the wheels 36 at a lower level than the castors 32 and 34. Also, these extra pipe pieces provide a resilient mounting for the wheels directly beneath the operator thus absorb some of the vibration and bumps which would otherwise be transmitted directly to the operator.

The propulsion system 40 includes forearm engaging loops 41 with handholds 42 arranged at the uppermost ends of the elongated shafts 43. These shafts have a telescoping length adjusting mechanism of conventional construction, to permit one to lengthen or shorten the distance between the handholds 42 and the ground engaging means so that the force transmitted to propel the vehicle can be optimized. The axles of the wheels 44 are fixed to a yolk 45 on the ground engaging ends of the shafts. To each of these wheel axles are fixed cam member 48 of the type found in the rear sprocket hub of a typical bicycle. Rollers 49 rotate freely between the inner surface of the hub 47 when the wheel rotates relative to the cam in one direction, but when the wheel begins to rotate in the other direction, the rollers 49 bind between the wheel and the cam and thus lock the wheel and cam together, preventing rotation. The provision of this clutch mechanism permits the wheels 44 to coast freely when the ground is moving to right (as shown in the sketch) relative to the propulsion wheels. However, the wheels lock to their respective axles when the shafts are thrust to the right as shown. This action permits the user to push firmly against the ground with the wheels 44 by pulling back on the handholds 42 or straps 41 to propel the platform forward, but permits the wheels 44 to turn freely with the ground during the return stroke or when coasting or resting.

Skid pads 46 are provided on a projecting arm attached to the yolk 45. These pads can be brought to bear onto the ground by merely twisting the wrist to rotate the shaft about its axis to bring the pad 46 into contact with the ground and move the wheel away from the ground. Then, by pushing down on the shafts by using the inner surfaces of the forearms, the operator can apply considerable retarding force to thus stop or slow the vehicle. In another embodiment, the handholds include brake handles which operate a cable system similar to bicycle systems. These operate a brakes which prevent or retard the rotation of the otherwise freewheeling wheels. Thus, the propulsion system can also be used to brake the rolling of the wheeled platform.

Figure 2:
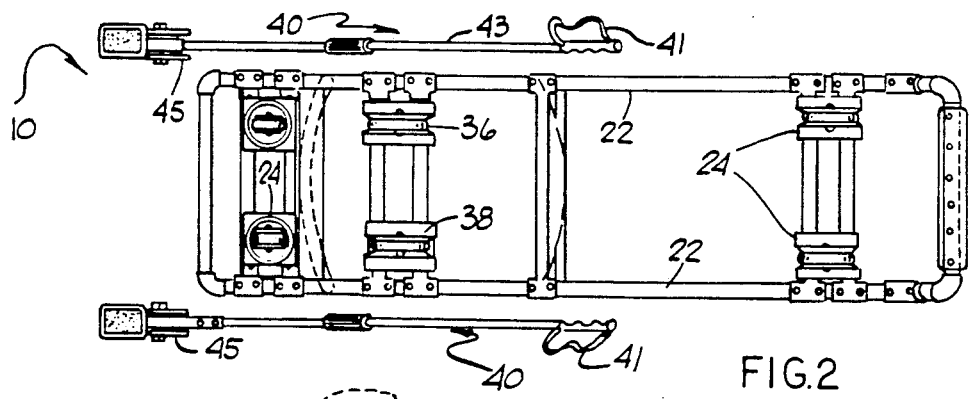
FIG. 2 is a plan view of the preferred embodiment viewed from below.
Figure 1:
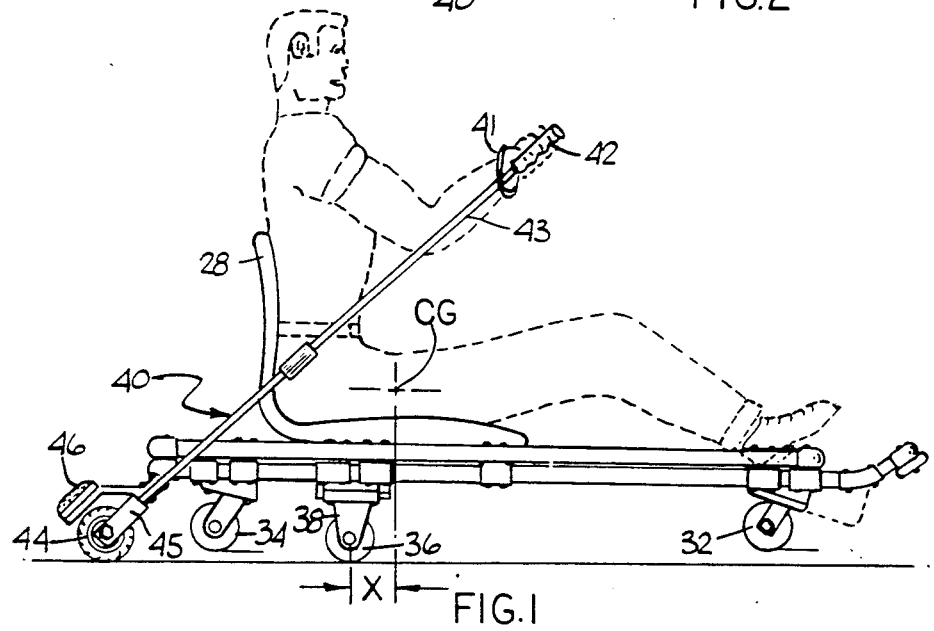
FIG. 1 is an elevation view of the preferred embodiment.
Figure 3:
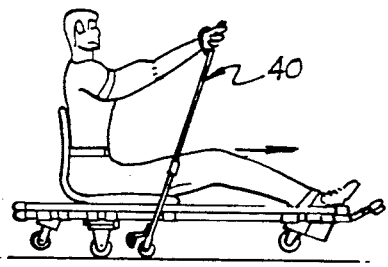
FIGS. 3, 4 and 5 show the preferred embodiment in use.
Figure 4:
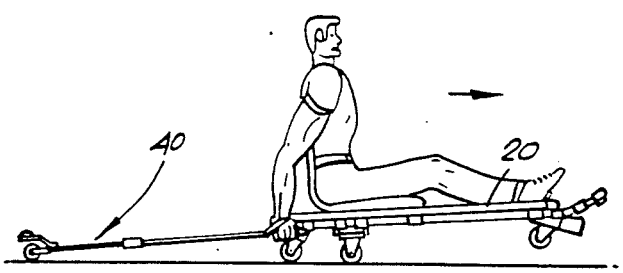

In operation, the straps are placed around the wrists of the operator and the length of the pole is adjusted so that at least the forearms, and preferably all of the arm of the operator, is raised above shoulder level at the start of the power stroke (see FIG. 3). The operator then pushes down and back on the pole. The downward force enhances the frictional force between the tire 44 and the ground, and increases the amount of thrusting force that can be generated in the power stroke through to the position shown in FIG. 4. It has been found that the high initial position of the arms in the beginning of the power stroke brings into operation different muscular groups than are normally used in the operation of a conventional wheel chair. The return stroke is highly simplified through the operation of the clutch mechanism in the wheel hub since the operator need only pull the handles 42 upward letting the wheels free-wheel on the ground as described above. In this way, the operator can resume the position shown in FIG. 3 for the next power stroke without having to lift wheel 44 off the ground. This has been found especially desirable, given the unusual length of the poles 43 used in the preferred embodiment.

Figure 5:
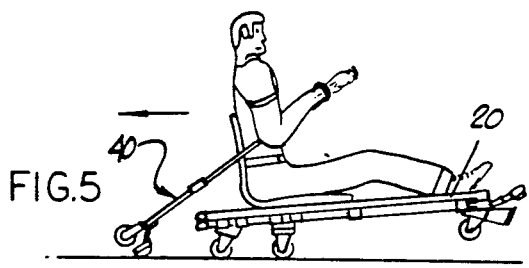
Figure 6:
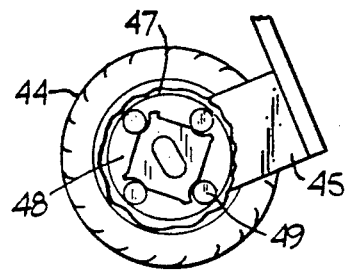
FIG. 6 shows the ground engaging means, partially broken away to show its internal arrangement.

To brake or slow the vehicle, the operator need only twist the poles slightly to bring the skid pad 46 into engagement with the ground as shown in FIG. 5. While the wheel 44 could be used for the braking function, in the absence of the pad 46, by twisting the pole to bring the opposite side of the wheel to contact the ground, such use can quickly wear flat spots into the rubber tread of the wheel. Thus, a separate brake pad as shown greatly increases the useful life of the propulsion system.

Figure 7:
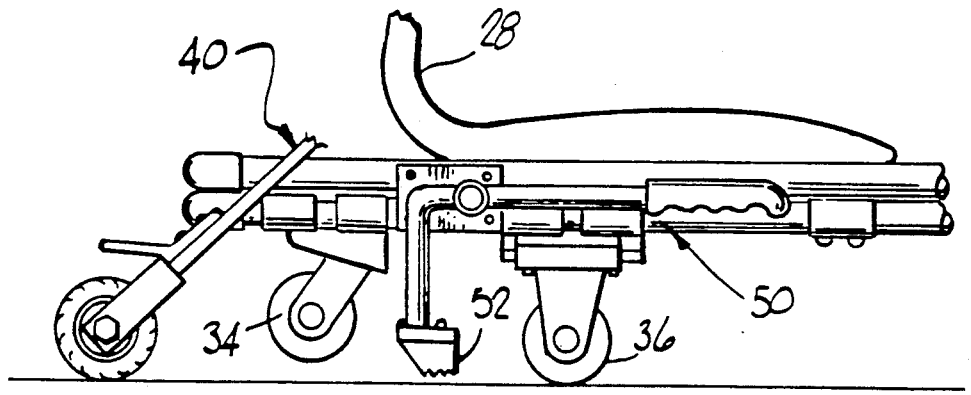
FIG. 7 is a partial view of a modification of the device shown in FIG. 1.

FIG. 7 shows a hand brake which can be used as an alternative to the pole mounted brake system, or to supplement the above described braking operation, or to steer the vehicle. This brake device 50 comprises a generally L-shaped handle fastened for pivotal movement to the sides of the frame 22. At its lowermost end is a brake pads 52 similar to 46 on the propulsion means. The operator need only pull upwardly on the handle to bring the pad 52 into frictional engagement with the ground, thus slowing or stopping the vehicle. An identical device is mounted on the other side of the vehicle so that each can be operated singly to steer the vehicle or simultaneously to stop it.

The advantage of positioning the wheels 36 on yolks 38 and pipe 26 is also illustrated in FIG. 5. By shifting his weight slightly back, the operator can raise the front castors 32 off the ground, thus permitting the vehicle to pass over low barriers (such as low steps or curbs) thus enhancing the versatility and maneuverability of the device.

The instant invention was first conceived to permit a paraplegic to play tennis, but the system could have many uses, for both handicapped and abled persons and while the propulsion system is disclosed as being used for a vehicle by a seated operator, it can also be used for roller skates and the like.

We claim:

1. A propulsion device for a wheeled vehicle comprising:
   a. an elongated pole;
   b. a handle means for manipulation by the operator of the vehicle at a first end of said pole;
   c. a ground engaging means for frictionally engaging the surface over which the vehicle is to be propelled at a second end of said pole, said ground engaging means including:
      i. a wheel means, and
      ii. a clutch device interconnecting said wheel means with said pole, said clutch device constructed so that said wheel means turns freely in one rotational direction, but resists turning in the other rotational direction, Whereby when said ground engaging means is pushed against said surface in one direction, thrust from said handle means is transmitted through said pole, through said wheel means and to the ground such that said vehicle is urged in the opposite direction, but when said wheel means is permitted to merely roll along said surface, said wheel means rotates freely.

2. A propulsion device as set forth in claim 1 wherein said handle means includes a handle to be gripped by the operator and a strap loop for engaging the wrist of the operator.

3. A propulsion device as set forth in claim 1 wherein said wheel means includes
   a. a surface engaging annular tire,
   b. a hub for rotationally mounting said tire,
   c. mounting means for attaching said hub to said pole, said hub incorporating therein said clutch means.

4. A propulsion device as set forth in claim 3 wherein said mounting means comprises a yolk attached at one end to said second end of said pole and at a second end opposite to said one end to an axle about which said hub may rotate.

5. A propulsion device as set forth in claim 4 wherein said ground engaging means further includes a friction block for frictionally engaging said surface, said frictional block mounted on said second end of said pole adjacent said wheel means.

6. A propulsion device as set forth in claim 5 wherein said friction block is mounted on said yolk.

7. A propulsion device as set forth in claim 6 wherein said friction block is mounted on an arm extending radially outward from said tire.

8. A propulsion device as set forth in claim 6 wherein said pole has a length about equal to the distance from said surface to above the shoulder level of the operator of the vehicle.

9. A propulsion device as set forth in claim 6 wherein said pole includes means for adjusting the distance between said handle means and said ground engaging means.

10. A combination of a wheeled vehicle and a propulsion device particularly adapted for use by a paraplegic such that the vehicle can be moved along a surface using primarily only the upper body of the operator as motive power comprising:
 a. a frame;
 b. a plurality of wheels mounted to the under side of said frame;
 c. a seat means mounted on the upper side of said frame;
 d. a propulsion means comprising
   i. an elongated pole;
   ii. a handle means for manipulation by the operator of the vehicle at a first end of said pole;
   iii. a ground engaging means for frictionally engaging the surface over which the vehicle is to be propelled at a second end of said pole;
   iv. said ground engaging means including:
     (1) a wheel means, and
     (2) a clutch device interconnecting said wheel means with said pole, said clutch device constructed so that said wheel means turns freely in one rotational direction, but resists turning in the other rotational direction, whereby when said ground engaging means is pushed against said surface in one direction, thrust from said handle means is transmitted through said pole, through said wheel means and to the ground such that said vehicle is urged in the opposite direction, but when said wheel means is permitted to merely roll along said surface, said wheel means rotates freely.

* * * * *